United States Patent
Khawand et al.

(10) Patent No.: US 7,937,102 B2
(45) Date of Patent: May 3, 2011

(54) METHOD OF OPERATING A MULTI-CAMP MOBILE COMMUNICATION DEVICE WHILE ENGAGED IN A CALL AND RECEIVING A DISPATCH CALL

(75) Inventors: Jean Khawand, Miami, FL (US); David R. Heeschen, Coral Springs, FL (US); Charbel Khawand, Miami, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 754 days.

(21) Appl. No.: 11/315,768

(22) Filed: Dec. 22, 2005

(65) Prior Publication Data

US 2007/0149231 A1    Jun. 28, 2007

(51) Int. Cl.
*H04B 7/00* (2006.01)
(52) U.S. Cl. ....... 455/518; 455/519; 455/90.2; 455/507; 370/432; 370/468
(58) Field of Classification Search .................. 455/518, 455/519, 90.2, 507, 502; 370/432, 468, 278
See application file for complete search history.

(56) References Cited

U.S. PATENT DOCUMENTS

| | | | |
|---|---|---|---|
| 4,396,804 A * | 8/1983 | Hashimoto | 379/83 |
| 4,788,711 A | 11/1988 | Nasco, Jr. | |
| 5,420,852 A * | 5/1995 | Anderson et al. | 370/364 |
| 5,526,403 A | 6/1996 | Tam | |
| 5,559,878 A * | 9/1996 | Keys et al. | 379/210.01 |
| 5,563,931 A | 10/1996 | Bishop et al. | |
| 5,613,196 A | 3/1997 | Barnes et al. | |
| 5,682,421 A | 10/1997 | Glovitz et al. | |
| 5,711,011 A | 1/1998 | Urs et al. | |
| 5,722,070 A | 2/1998 | Alford | |
| 5,765,110 A | 6/1998 | Koizumi | |
| 5,809,018 A | 9/1998 | Lehmusto | |
| 6,002,948 A | 12/1999 | Renko et al. | |
| 6,018,671 A | 1/2000 | Bremer | |
| 6,060,979 A * | 5/2000 | Eichsteadt | 340/287 |
| 6,097,796 A * | 8/2000 | Tanaka | 379/100.06 |
| 6,138,030 A | 10/2000 | Coombes et al. | |
| 6,275,690 B1 | 8/2001 | Higuchi et al. | |
| 6,486,794 B1 | 11/2002 | Calistro et al. | |
| 6,701,156 B2 | 3/2004 | Akhteruzzaman et al. | |
| 6,751,468 B1 * | 6/2004 | Heubel et al. | 455/518 |
| 6,794,845 B2 * | 9/2004 | Richards et al. | 320/103 |
| 6,801,707 B1 | 10/2004 | Harumoto et al. | |
| 6,898,436 B2 | 5/2005 | Crockett et al. | |

(Continued)

OTHER PUBLICATIONS

Patent Cooperation Treaty, "International Search Report and Written Opinion", ISA/US, by Officer Blane R. Copenhaeaver in PCT Application No. PCT/US06/61896; Document of 6 pages dated Oct. 25, 2007.

(Continued)

*Primary Examiner* — Minh D Dao

(57) ABSTRACT

A multi-camp mobile communication device (100) includes a first radio modem (102) and a second radio modem (104). Each modem is designed to communicate with a respective communication system (110, 112). Upon engaging in an interconnect call (204) over the first modem with the first communication system, the multi-camp mobile communication device receives a dispatch call at the second modem (206) from the second communication system. The multi-camp mobile communication device replies to the dispatch call with a pre-recorded message (208). The dispatch calling party may respond to the pre-recorded message with a voice message that is recorded by the multi-camp mobile communication device (210, 212).

15 Claims, 3 Drawing Sheets

U.S. PATENT DOCUMENTS

| | | | |
|---|---|---|---|
| 6,959,203 B2 * | 10/2005 | Claxton et al. | 455/556.1 |
| 6,993,360 B2 * | 1/2006 | Plahte et al. | 455/555 |
| 7,123,906 B1 | 10/2006 | Otterbeck et al. | |
| 7,146,187 B2 * | 12/2006 | Richards et al. | 455/556.1 |
| 7,174,168 B2 * | 2/2007 | Klein et al. | 455/445 |
| 7,209,736 B2 * | 4/2007 | Link et al. | 455/419 |
| 7,280,502 B2 * | 10/2007 | Allen et al. | 370/329 |
| 7,398,079 B2 * | 7/2008 | Munje | 455/412.1 |
| 7,565,115 B2 | 7/2009 | Alexis | |
| 7,570,617 B2 | 8/2009 | Kil et al. | |
| 2003/0153343 A1 | 8/2003 | Crockett et al. | |
| 2003/0154249 A1 | 8/2003 | Crockett et al. | |
| 2004/0033811 A1 * | 2/2004 | Tsai et al. | 455/554.1 |
| 2004/0082317 A1 | 4/2004 | Graefen | |
| 2004/0127263 A1 | 7/2004 | Vegh | |
| 2004/0181584 A1 | 9/2004 | Rosen et al. | |
| 2004/0192372 A1 * | 9/2004 | Richards et al. | 455/550.1 |
| 2004/0203794 A1 | 10/2004 | Brown et al. | |
| 2004/0203940 A1 | 10/2004 | Urs | |
| 2004/0219936 A1 | 11/2004 | Kontiainen | |
| 2004/0254998 A1 * | 12/2004 | Horvitz | 709/206 |
| 2005/0034079 A1 * | 2/2005 | Gunasekar et al. | 715/753 |
| 2005/0059419 A1 | 3/2005 | Sharo | |
| 2005/0165658 A1 | 7/2005 | Hayes, Jr. et al. | |
| 2005/0190723 A1 | 9/2005 | Rao et al. | |
| 2005/0195802 A1 | 9/2005 | Klein et al. | |
| 2005/0201362 A1 | 9/2005 | Klein et al. | |
| 2005/0239485 A1 | 10/2005 | Kundu et al. | |
| 2005/0255811 A1 * | 11/2005 | Allen et al. | 455/78 |
| 2006/0003740 A1 * | 1/2006 | Munje | 455/412.1 |
| 2006/0003745 A1 | 1/2006 | Gogic | |
| 2006/0080344 A1 * | 4/2006 | McKibben et al. | 707/100 |
| 2006/0148497 A1 | 7/2006 | Fernandez et al. | |
| 2006/0209174 A1 * | 9/2006 | Isaac et al. | 348/14.01 |
| 2006/0256942 A1 | 11/2006 | Gatzke et al. | |
| 2006/0262743 A1 * | 11/2006 | Kalhan et al. | 370/328 |
| 2006/0270429 A1 * | 11/2006 | Szymanski et al. | 455/518 |
| 2007/0010275 A1 * | 1/2007 | Kiss | 455/521 |
| 2007/0049314 A1 | 3/2007 | Balachandran et al. | |
| 2007/0055559 A1 | 3/2007 | Clawson | |
| 2007/0142047 A1 | 6/2007 | Heeschen et al. | |
| 2007/0147316 A1 | 6/2007 | Khan et al. | |
| 2007/0270104 A1 * | 11/2007 | Allen et al. | 455/78 |
| 2008/0063161 A1 * | 3/2008 | Joyce et al. | 379/114.2 |
| 2008/0107089 A1 * | 5/2008 | Larsson et al. | 370/338 |

OTHER PUBLICATIONS

TelephonyDesign.Com, "Smart Voice Mail, wish I had this on my cell phone", http://ptd.weblogger.com/stories/storyReader$271, Sep. 5, 2002, pp. 1-2.

* cited by examiner

METHOD OF OPERATING A MULTI-CAMP MOBILE COMMUNICATION DEVICE WHILE ENGAGED IN A CALL AND RECEIVING A DISPATCH CALL

TECHNICAL FIELD

This invention relates in general to mobile communication devices, and in particular multi-camp mobile communication devices, and call handling when a dispatch call is received over one communication system while already engaged in an interconnect call over the other communication system.

BACKGROUND OF THE INVENTION

Mobile communication devices are in widespread use throughout the world, and in particular in metropolitan regions of the world. These devices have become so popular that in many places that it is often taken for granted that a person owns one. To remain competitive, manufactures of mobile communication devices and communication service providers have sought to include unique features to attract customers. One such feature is dispatch calling. Dispatch calling is similar in operation to direct two-way radio communication, sometimes referred to as "walkie-talkie," or half duplex operation. However, modern dispatch calling utilizes a communication infrastructure to enable calling over large distances. Dispatch calling is initiated at a mobile communication device by pressing a so called push to talk (PTT) button, after selecting a party to call. Upon pushing the PTT button, the mobile communication device transmits a dispatch call request to a dispatch communication processor which sets up a dispatch call circuit with the intended target. Upon setting up the dispatch call circuit, the calling party receives an alert indicating the user may commence speaking. This happens in a manner that is much faster than normal duplex cellular telephony. The system is designed so that as soon as the user presses the PTT button they can begin talking, and their voice will be heard at the target device with very little delay. The target party does not need to answer the call as answering is automatic and the incoming voice signal is played over a loudspeaker of the receiving mobile communication device.

The speed with which other parties can be reached has made dispatch calling very popular in the marketplace. It is typically provided as an alternative calling mode on a mobile communication device which also has the ability to engage in more conventional cellular or interconnect telephony calling. The popularity of dispatch calling has led to multi-camp mobile communication devices, which have two (or more) radio frequency sections or modems so as to be camped on different communication systems at the same time, able to commence and receive calls from either of the systems while idle.

However, when the multi-camp mobile communication device is engaged in an interconnect call on one system, and receives a dispatch call on another system, the multi-camp mobile communication device conventionally has no way to respond because the audio section of the multi-camp mobile communication device is being used for the interconnect call. This leads to the dispatch calling party receiving a call failed result.

DETAILED DESCRIPTION

Figure 1:
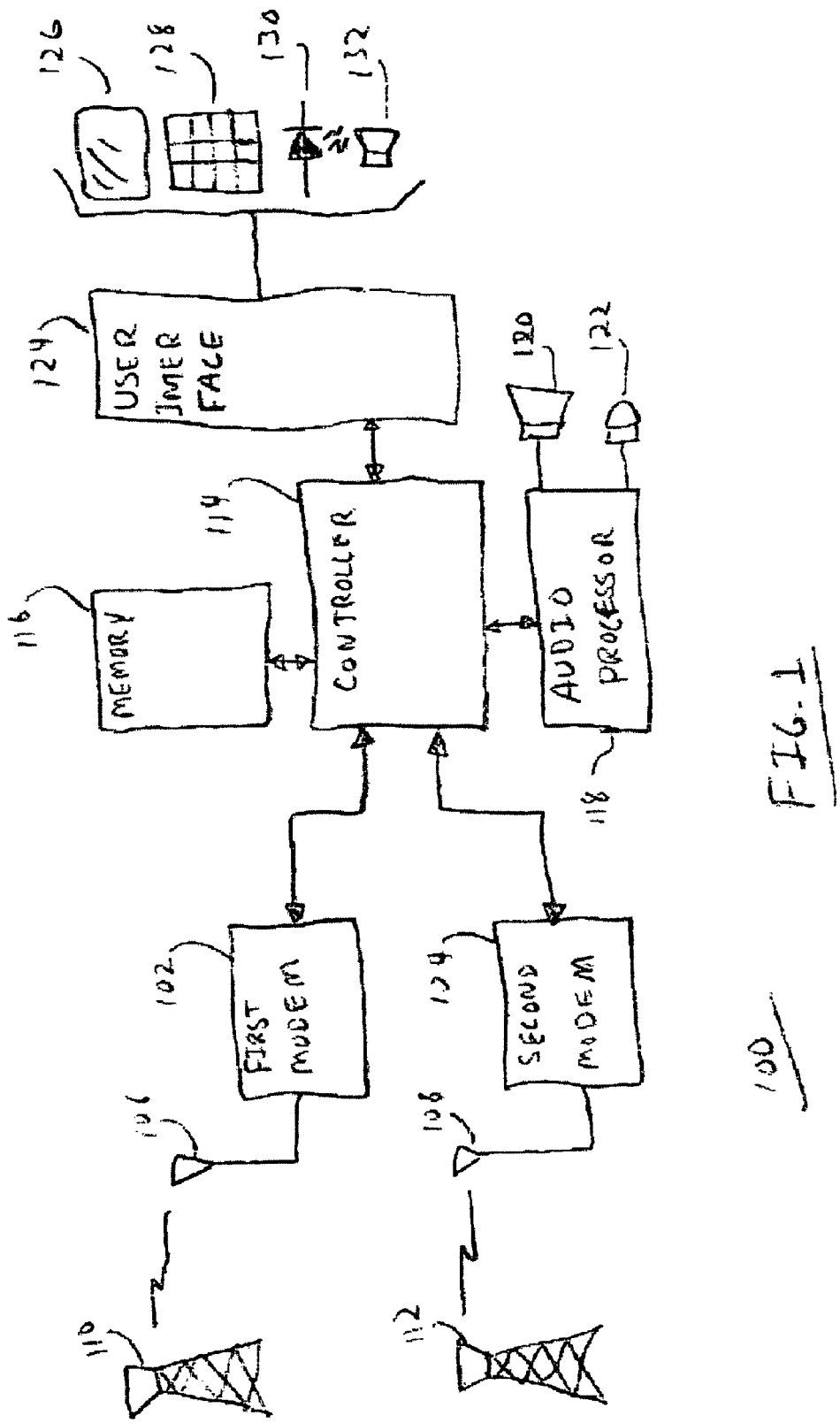
FIG. 1 shows a block schematic diagram of a multi-camp mobile communication device, in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward. The invention solves the problem of processing a received dispatch call from one communication system at the multi-camp mobile communication device while the multi-camp mobile communication device is currently engaged in an interconnect call with another communication system by taking advantage of the presence of a second modem of the multi-camp mobile communication device. While the audio of the dispatch call can't be played during the interconnect call, the multi-camp mobile communication device can respond with a canned or pre-recorded message, informing the dispatch calling party that the user is busy. Furthermore, the message may invite the dispatch calling party to respond with a voice message, and the multi-camp mobile communication device may record the voice message for later retrieval by the user of the multi-camp mobile communication device.

Referring now to FIG. 1, there is shown a block schematic diagram 100 of a multi-camp mobile communication device, in accordance with an embodiment of the invention. The multi-camp mobile communication device contains a first modem 102 and at least a second modem 104. The modems are radio modems, and transmit and receive information via their respective antennas 106, 108. The first modem communicates with a first communication system 110, and the second modem communicates with a second communication system 112. The two communication systems may have different air interfaces, and so may use different modulation schemes. Each of the modems 102, 104 are coupled to a controller 114 of the multi-camp mobile communication device. The controller directs general operation of the multi-camp mobile communication device and it's various components, subsystems, and interfaces. The controller operates according to instruction code stored in a memory 116, which may include a variety of memory elements such as volatile and non-volatile memory, random access memory, read only memory, and so on. To facilitate voice communication, the multi-camp mobile communication device contains an audio processor 118. The audio processor converts digital audio signals received from by the modems to analog signals to be played over a speaker 120 such as an earpiece of the multi-camp mobile communication device. The audio processor also converts analog audio signals received at a microphone 122 to digital signals to be transmitted by one of the modems. The controller also operates a user interface 124, abstracted here to a block, but which includes a variety of circuits and systems, such as, for example, display drivers, keypad circuits, and so on. The user interface may include a graphical display 126, a keypad and other input buttons such as a PTT button, light sources 130, and speaker elements 132. All of these elements allow user interaction with the multi-camp mobile communication device.

Figure 2:
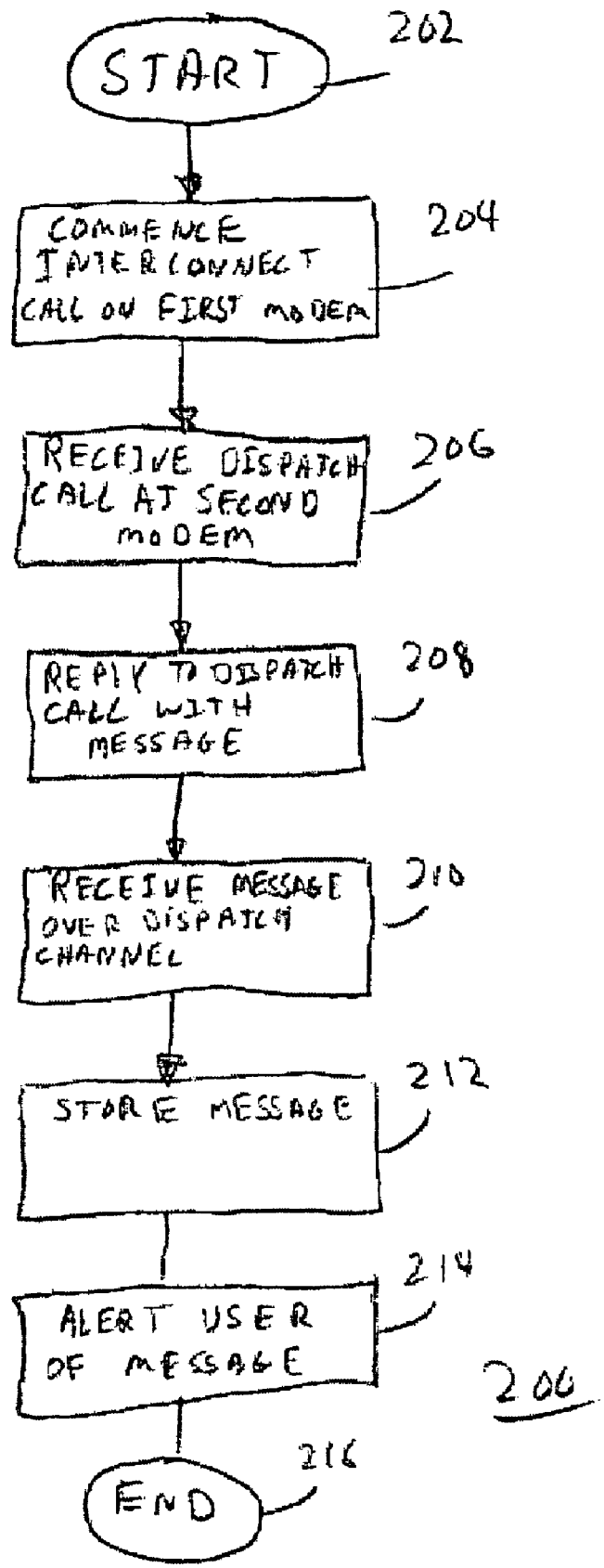
FIG. 2 shows a flow chart diagram of a method of processing a received dispatch call from one communication system at the multi-camp mobile communication device while the multi-camp mobile communication device is currently engaged in an interconnect call with another communication system, in accordance with an embodiment of the invention.

Referring now to FIG. 2, there is shown a flow chart diagram 200 of a method of processing a received dispatch call from one communication system at the multi-camp mobile communication device while the multi-camp mobile communication device is currently engaged in an interconnect call with another communication system, in accordance with an embodiment of the invention. At the start 202, the multi-camp mobile communication device is powered up and camped on two different communication systems using the two modems. By "camped" it is meant that the multi-camp mobile communication device is registered for service, but not engaged in a call. Periodically the multi-camp mobile communication device will check to see if there is an incoming call from the communication systems. At some point the multi-camp mobile communication device commences an interconnect call on the first communication system 204 using the first modem. The call may be initiated at the multi-camp mobile communication device, or it may be the result of being called by another party. During the interconnect call, the second modem receives another call, such as a dispatch call 206. It is contemplated that other forms of calling may be received at the second modem as well, including interconnect calls, voice over IP calls, and so on. The second modem will first receive an incoming dispatch call page from the second communication system, to which it will respond. Upon responding to the incoming dispatch call page, the second communication system sets up a dispatch call circuit and alerts the dispatch calling party to commence speaking an initial audio burst. The multi-camp mobile communication device may record a dispatch identifier of the dispatch calling party. The initial audio burst may be received by the multi-camp mobile communication device, but will not be heard by the user of the multi-camp mobile communication device because of the ongoing interconnect call. Once the dispatch calling party stops talking and releases the circuit, the multi-camp mobile communication device can transmit a pre-recorded message over the dispatch circuit 208 over the second modem. The pre-recorded message may include an invitation to respond so that the multi-camp mobile communication device may record the response. If such is the case, and the dispatch calling party responds, the multi-camp mobile communication device will receive the response over the dispatch channel 210 at the second modem. As the message is received, the multi-camp mobile communication device stores the message 212. Once stored, the multi-camp mobile communication device may alert the user 214 of the multi-camp mobile communication device of the stored message. The alert may be in the form of a blinking light, a sound, a message on the graphical display, and so on. Thereafter the method terminates 216. It will be appreciated by those skilled in the art that the dispatch call is responded to without intervention by the communication system, thus the method requires no changes to the communication system. To the communication system the exchange is a normal dispatch call.

Figure 3:
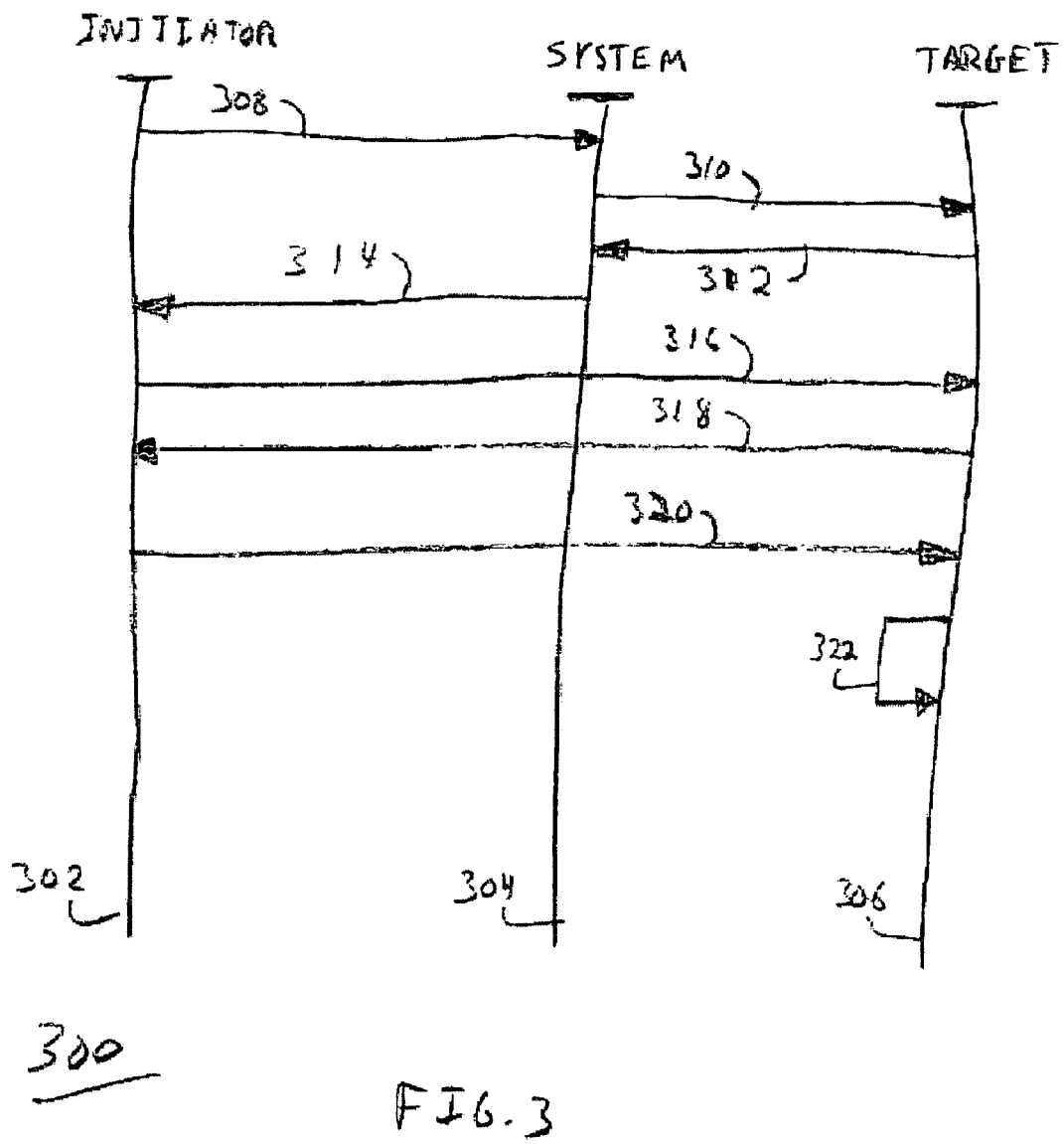
FIG. 3 shows a signal flow diagram of a method of processing a received dispatch call from one communication system at the multi-camp mobile communication device while the multi-camp mobile communication device is currently engaged in an interconnect call with another communication system, in accordance with an embodiment of the invention.

Referring now to FIG. 3, there is shown a signal flow diagram 300 of a method of processing a received dispatch call from one communication system at the multi-camp mobile communication device while the multi-camp mobile communication device is currently engaged in an interconnect call with another communication system, in accordance with an embodiment of the invention. The signal flow illustrated here is among an initiating dispatch calling party 302, the communication system 304 that supports dispatch calling, and the target 306, which is a multi-camp mobile communication device. For purposes of this discussion, assume the target multi-camp mobile communication device is presently engaged in an interconnect call over a different communication system using a different modem than the one used here for the dispatch call. The initiator 302 initiates a dispatch call by requesting a dispatch call set up 308 of the system 304. The system then pages the target 310 with an incoming dispatch call page. Upon receiving the page, the target multi-camp mobile communication device responds 312 to accept the dispatch call. The system then informs the initiator to commence speaking. The initiator device will prompt the user of the initiating mobile communication device to commence speaking, and the speech is transmitted to the target 316. In response, once the initiator releases the circuit, the target multi-camp mobile communication device responds with a pre-recorded message 318. The message informs the initiator that the user of the multi-camp mobile communication device is busy, and may invite the initiator to respond with a brief message. The initiator may then respond with a message 320, which the multi-camp mobile communication device with then store 322.

Thus, the invention provides a method of operating a multi-camp mobile communication device, which commences by establishing an interconnect call with a first communication system at a first modem of the mobile communication device. During the interconnect call, the multi-camp mobile communication device receives an incoming dispatch call over a dispatch circuit of a second communication system at a second modem of the mobile communication device. The dispatch call is initiated by a dispatch calling party. The multi-camp mobile communication device responds automatically to the dispatch call, without action from a user of the multi-camp mobile communication device, with a pre-recorded message stored in the mobile communication device indicating that the user of the mobile communication device is currently busy. Upon receiving the dispatch call, or the incoming dispatch call page, the multi-camp mobile communication device may retain the dispatch identifier of the dispatch calling party. The dispatch identifier is similar to a phone number, and uniquely identifies the calling party. Subsequent to responding to the dispatch call, the multi-camp mobile communication device may receive a message from the dispatch calling party over the dispatch circuit, and store the message. The multi-camp mobile communication device, upon conclusion of the dispatch call, may alert the user of the multi-camp mobile communication device that the message has been stored. The alerting may be performed by at least one of an audio alert and a visual alert. Finally, the interconnect call may be performed using a code division multiple access air interface at the first modem.

The invention also provides for a multi-camp mobile communication device having first and second modems, and a controller for controlling operation of the modems. When the first modem is engaged in a call, and a dispatch call is received at the second modem, the multi-camp mobile communication device is programmed to respond to the dispatch call by transmitting a pre-recorded message in response over the dispatch circuit. The dispatch calling party may then respond to the message, the response may be recorded by the multi-camp mobile communication device. The user of the multi-camp mobile communication device may be alerted of the dispatch call and to the recording of the message.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of operating a multi-camp mobile communication device, comprising:
   establishing an interconnect call with a first communication system at a first modem of the mobile communication device;
   during the interconnect call:
      receiving an incoming dispatch call over a dispatch circuit of a second communication system at a second modem of the mobile communication device, the dispatch call initiated by a dispatch calling party;
      responding automatically to the dispatch call, without action from a user of the multi-camp mobile communication device, with a pre-recorded message stored in the mobile communication device indicating that the user of the mobile communication device is currently busy.

2. A method of operating a multi-camp mobile communication device as defined in claim 1, further comprising retaining a dispatch identifier of the dispatch calling party.

3. A method of operating a multi-camp mobile communication device as defined in claim 1, further comprising:
   subsequent to responding to the dispatch call, receiving a message from the dispatch calling party over the dispatch circuit; and
   storing the message in the multi-camp mobile communication device.

4. A method of operating a multi-camp mobile communication device as defined in claim 3, further comprising alerting a user of the multi-camp mobile communication device that the message has been stored.

5. A method of operating a multi-camp mobile communication device as defined in claim 4, wherein the alerting is performed by at least one of an audio alert and a visual alert.

6. A method of operating a multi-camp mobile communication device as defined in claim 1, wherein the interconnect call is performed using a code division multiple access air interface.

7. A multi-camp mobile communication device, comprising:
   a first modem for connecting to a first communication network;
   a second modem for connecting to a second communication system; and
   a controller for controlling operation of the first and second modems;
   wherein, when the first modem is engaged in a call with the first communication system and the second modem receives a dispatch call from a dispatch calling party over the second communication system, the controller responds to the dispatch call by transmitting a message to the dispatch calling party.

8. A multi-camp mobile communication device as defined in claim 7, wherein upon receiving the dispatch call, the multi-camp mobile communication device retains a dispatch identifier of the dispatch calling party in a memory 9. A multi-camp mobile communication device as defined in claim 7, wherein, subsequent to responding to the dispatch call, the multi-camp mobile communication device receives a message from the dispatch calling party over the dispatch circuit, and stores the message in a memory of the multi-camp mobile communication device.

10. A multi-camp mobile communication device as defined in claim 9, further comprising a user interface for alerting a user of the multi-camp mobile communication device that the message has been stored.

11. A multi-camp mobile communication device as defined in claim 10, wherein the user interface includes at least on of an audio alert element and a visual alert element.

12. A multi-camp mobile communication device as defined in claim 7, wherein the first modem is a code division multiple access modem.

13. The multi-camp mobile communication device of claim 7, wherein the first modem and the second modem camp on the first and second communication systems at the same time.

14. The multi-camp mobile communication device of claim 13, wherein the first modem and the second modem commence and receive calls for either of the first communication system or the second communication system while idle.

15. The multi-camp mobile communication device of claim 7, wherein the multi-camp mobile communication device processes a received dispatch call on the first communication system using the first modem while the multi-camp mobile communication device is currently engaged in an interconnect call with the second communication system using the second modem.

* * * * *